(12) United States Patent  (10) Patent No.: US 8,490,640 B2
Mahapatro et al.  (45) Date of Patent: Jul. 23, 2013

(54) LATCHING PRESSURE REGULATOR

(75) Inventors: Hrudaya Mahapatro, Canton, MI (US); Robert O. Burkhart, Novi, MI (US); John Butwin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 718 days.

(21) Appl. No.: 12/481,636

(22) Filed: Jun. 10, 2009

(65) Prior Publication Data

US 2010/0313970 A1 Dec. 16, 2010

(51) Int. Cl.
*G05D 11/02* (2006.01)

(52) U.S. Cl.
USPC .......... 137/112; 137/625.6; 137/625.66; 251/26; 251/29; 192/85.63

(58) Field of Classification Search
USPC .......... 251/26, 28, 29; 137/112, 625.6, 137/625.64, 625.66; 475/127, 128, 129; 192/85.63, 3.58
See application file for complete search history.

(56) References Cited

U.S. PATENT DOCUMENTS

| | | | | |
|---|---|---|---|---|
| 4,281,676 A | * | 8/1981 | Morris | 137/102 |
| 4,311,296 A | * | 1/1982 | Scheffel | 251/29 |
| 4,657,041 A | * | 4/1987 | Mitsui | 137/116.3 |
| 4,685,748 A | * | 8/1987 | Zoerb | 303/117.1 |
| 4,765,202 A | * | 8/1988 | Hayasaki | 477/119 |
| 5,509,448 A | * | 4/1996 | Wilson et al. | 137/625.64 |
| 6,591,958 B1 | * | 7/2003 | Moorman | 192/85.63 |
| 6,595,340 B2 | * | 7/2003 | Moorman et al. | 192/85.25 |
| 6,796,330 B1 | * | 9/2004 | Moorman | 137/625.66 |
| 7,282,005 B2 | * | 10/2007 | Shimizu et al. | 475/127 |
| 7,325,885 B2 | | 2/2008 | Berger et al. | |
| 7,438,660 B2 | | 10/2008 | Long et al. | |
| 7,673,652 B2 | * | 3/2010 | Takagi | 137/596.16 |
| 2005/0211295 A1 | * | 9/2005 | Long et al. | 137/112 |
| 2006/0105882 A1 | * | 5/2006 | Park et al. | 477/127 |

\* cited by examiner

*Primary Examiner* — John Fox
*Assistant Examiner* — Kevin Murphy
(74) *Attorney, Agent, or Firm* — James Dottavio; MacMillan, Sobanski & Todd, LLC

(57) ABSTRACT

A system for regulating pressure supplied to a transmission control element, includes a control pressure source and line pressure source, a latch valve that opens and closes communication with the line pressure source in response to control pressure, and a regulator valve including a spool for regulating line pressure and producing control element pressure when the latch valve is closed, and an auxiliary piston responsive to line pressure and contacting the spool for connecting line pressure to the control element when the latch valve is open.

9 Claims, 1 Drawing Sheet

LATCHING PRESSURE REGULATOR

BACKGROUND OF THE INVENTION

1. Field of the Invention

This invention relates generally to a hydraulic control system for an automatic transmission, and, more particularly, to a regulator valve and system for controlling pressure in a friction control element of the transmission.

2. Description of the Prior Art

A friction control element, such as a clutch or brake of an automatic transmission, can be applied and released using a combination of a regulator valve, latch valve and variable bleed solenoid (VBS) pressure in the hydraulic control circuit of the transmission.

Ideally, the control system applies the clutch by an increase VBS pressure, which opens the regulator valve and allows flow to the clutch from a source of line pressure. After application of the clutch is complete and at the end of the gear ratio change, the latch valve vents feedback pressure to the regulator valve, allowing full line pressure to be directly applied to the clutch.

The system releases the clutch by reducing VBS pressure until the latch valve moves to allow the feedback of the regulator valve to refill. Further lowering VBS pressure proportionally lowers clutch pressure by controlling the vent of clutch pressure to a pressurized exhaust.

Such control elements are susceptible to air ingestion, undershoot and sluggish response, and operational instability. Air ingestion occurs when the feedback pressure is vented during latching. Air remains in the chamber when the system is refilled, causing a high compliance, leading to overshoot, instability, and sluggish response of the regulator, and non-ideal control of clutch capacity. The overshoot in clutch pressure occurs during boost or stroke phase and low frequency shudder from loss of damping during ratio change phase.

An undershoot in clutch pressure occurs during the unlatch of an offgoing clutch event just before the gear ratio change, due to the dumping of feedback pressure to exhaust from an initial high line pressure. This adversely affects shift quality.

A change in the worm trail may prevent air ingestion or an increase in sump level, but achieving an ideal worm trail routing is not always feasible due to packaging requirements. Also, maintaining a high fluid level in the oil pan with a chain drive moving in the oil reduces fuel economy due to spin loss and potential aeration of oil.

Locating a regulator valve and latch valve in different layers of the main control, requires a large volume of worm trail between regulator outlet and feedback orifice, which decreases stiffness.

SUMMARY OF THE INVENTION

A system for regulating pressure supplied to a transmission control element, includes a control pressure source and line pressure source, a latch valve that opens and closes communication with the line pressure source in response to control pressure, and a regulator valve including a spool for regulating line pressure and producing control element pressure when the latch valve is closed, and an auxiliary piston responsive to line pressure and contacting the spool for connecting line pressure to the control element when the latch valve is open.

The auxiliary piston, located at the end of the regulator valve, can be packaged in the same bore as the regulator valve spool. The latch valve is simplified because it does not connect to the regulator output and the feedback pressure.

The regulator valve becomes latched when it bottoms out in response to opposing line pressure force against feedback pressure, thereby eliminating feedback exhaust air issues.

The unlatch and release of the offgoing clutch is stable and deliberate due to maintaining back pressure at the line pressure end of the auxiliary piston, as this pressure is exhausted at the latch valve through an orifice.

The system method provides an alternative to ramp down clutch pressure without causing oscillation and saving time.

The spring the behind auxiliary piston provides compliance to stabilize the VBS valve while the regulator valve spool is bottomed out during boost.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
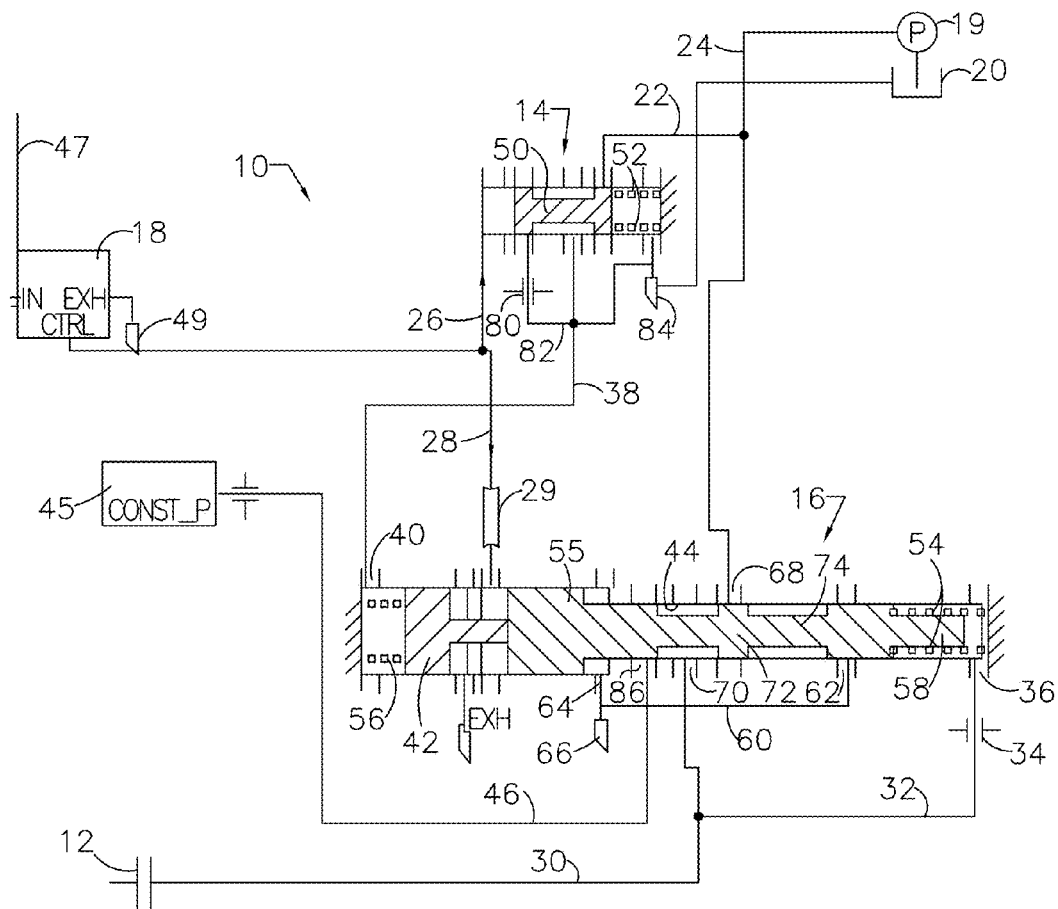
FIG. 1 is a schematic diagram showing a hydraulic system that includes a regulator valve and latch valve for controlling pressure in a transmission control element.

Referring now to the drawing, a portion of the hydraulic control system 10 for supplying pressurize to a friction control element, such as a clutch or brake 12, of an automatic transmission includes a latch valve 14, pressure regulator valve 16, and a control pressure valve 18, such as a variable bleed solenoid (VBS).

A pump 19 draws automatic transmission fluid (ATF) from an oil sump 20 in the transmission and delivers it at line pressure through lines 22, 24 to latch valve 14 and pressure regulator valve 16. Control pressure valve 18 is connected through line 26 to latch valve 14 and through line 28 and tube 29 to regulator valve 16. Regulated pressure, connected through line 30 to the transmission control element 12, is also carried in line 32 through orifice 34 to a feedback port 36 at one end of regulator valve 16.

When pressure in line 26 is relatively low, the state of latch valve 14 is unlatched and line pressure in line 22 is closed. When pressure in line 26 is relatively high, the state of latch valve 14 is latched, the spool 50 moves rightward from the position shown in the figure, and line pressure in line 22 is connected to line 38, which connects the line pressure source 24 to a port 40 at the opposite end of valve 16 from the location of feedback port 36. An auxiliary piston 42, located in the chamber 44 of valve 16 and contacting piston 74, is actuated by pressure in line 38 to latch regulator valve 16.

A source of exhaust backpressure 45 maintains fluid at a pressure of about 3 psi in line 46.

Solenoid feed pressure is carried in line 47 to the solenoid-actuated valve 18. A variable electric current supplied to solenoid-actuated valve 18 regulates the pressure produced by valve 18 by opening and closing a connection between vent port 49 and line 47 in response to the current. Each vent port communicates with sump 20, which is at atmospheric pressure.

In operation, when the solenoid-actuated valve 18 produces a relatively low magnitude of control pressure in line 26, valve 14 is unlatched and closes. Spool 50 moves leftward from its position shown in the figure due to the force of a compression spring 52 opposing the control pressure force on the left-hand end of spool 50. A control pressure force directed rightward is applied to land 55 of spool 74.

With valve 14 unlatched, valve 16 regulates the magnitude of control element pressure supplied to clutch 12 by balancing the force of compression springs 54, 56, the control pressure force produced on the end of control land 55, and the feedback pressure force acting on the end of land 58. Line 60 connects ports 62, 64 to a vent port 66, which is at atmospheric pressure. The line pressure source 24 communicates through ports 68, 70 to the clutch 12 as control land 72 opens and closes valve 16 in response the spring forces and pressure forces on spool 74. With latch valve 14 in the low pressure unlatched state, valve 16 regulates pressure in line 30 as required to engage clutch 12.

When the solenoid-actuated control valve 18 produces a relatively high magnitude of pressure in line 26, the spool 50 of latch valve 14 moves rightward against the force of spring 52, thereby opening a connection between the line pressure source 24 and line 38 through line 22. The additional pressure force on the end of auxiliary piston 42 due to pressure in line 38 and port 40 forces spool 74 rightward, thereby fully opening regulator valve 16 and connecting line 24 to line 30 without exhausting feedback pressure in port 36. When the solenoid-actuated control valve 18 produces this high magnitude of pressure in line 26, clutch 12 is fully engaged and its torque transmitting capacity is maximized.

Clutch 12 is disengaged when the solenoid-actuated control valve 18 produces a relatively low magnitude of pressure in line 26, allowing spool 50 to move leftward from the position shown in the figure due to the force of spring 52. This movement of spool 50 closes line 22 from line 38 and connects line 38 to vent port 84 through latch valve 14, orifice 80 and line 82. This unlatches valves 14 and 16.

With line 38 so vented, auxiliary piston 42 and spool 74 move leftward, opening a connection between clutch 12 and the backpressure source 45 through line 30, port 70, valve chamber 44, port 86 and line 46. The source of exhaust backpressure 45 maintains fluid at a pressure of about 3 psi in line 46 when pressure in line 46 is reduced to disengage the clutch or brake 12. This backpressure prevents the clutch or brake 12 from being exhausted and air from filling line 46.

The spring 56 behind auxiliary piston 45 provides compliance to stabilize the VBS valve 16 while the regulator valve spool 74 is bottomed out during boost.

Figure 2:
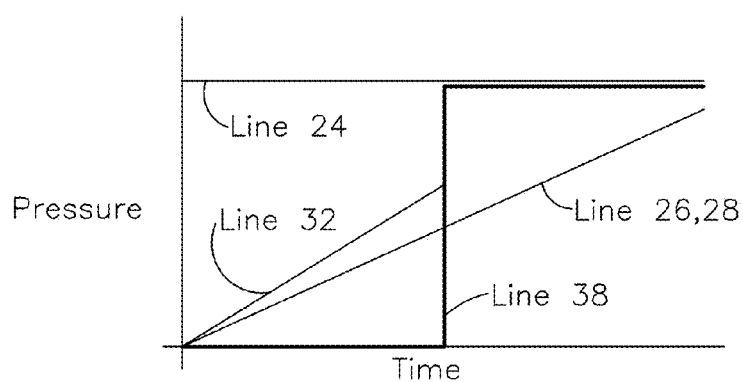
FIG. 2 is a graph showing the variation of pressure in lines of the system of FIG. 1.

FIG. 2 illustrates the variation of pressure in lines 24, 26, 28 32 and 38 of the system of FIG. 1.

The system permits opening a signal orifice to get to boost pressure quickly, without sacrificing damping required during the unlatch event.

In accordance with the provisions of the patent statutes, the preferred embodiment has been described. However, it should be noted that the alternate embodiments can be practiced otherwise than as specifically illustrated and described.

The invention claimed is:

1. A system for regulating pressure supplied to a transmission control element, comprising:
    a control pressure source;
    a line pressure source;
    a latch valve including a first spool, to which is applied a force of a first spring tending to close first communication with the line pressure source, and a first control pressure force produced by the control pressure source tending to open the first communication; and
    a regulator valve including a second spool to which is applied a force of a second spring, and a control element feedback pressure force tending to close a second communication between line pressure and the control element, and a second control pressure force produced by the control pressure source tending to open the second communication when the latch valve is opened and closed, and an auxiliary piston transmitting to the second spool a force of a third spring and a line pressure force tending to open the second communication when the first communication is open, the control element feedback pressure remaining pressurized when the second communication is opened and closed.

2. The system of claim 1, wherein the regulator valve regulates control element pressure when the latch valve is closed.

3. The system of claim 1, wherein the regulator valve regulates control element pressure when the first control pressure force is low relative to the first spring force.

4. The system of claim 1, wherein the auxiliary piston transmits to the second spool a line pressure force tending to open the second communication when the latch valve is open.

5. The system of claim 1, wherein the regulator valve does not regulate control element pressure when the latch valve is open.

6. The system of claim 1, further comprising:
    a backpressure source; and
    a fluid line communicating control element pressure through the regulator valve to the backpressure source when the control element is released.

7. The system of claim 6, wherein the backpressure source maintains a positive pressure in the fluid line.

8. The system of claim 1, wherein the control pressure source comprises a solenoid-activated valve to which a variable electric current is applied to vary a magnitude of control pressure.

9. The system of claim 1, further comprising a fluid path through the latch valve between the auxiliary piston and a vent port when the first communication is closed.

* * * * *